United States Patent [19]
Becker et al.

[11] 3,828,920
[45] Aug. 13, 1974

[54] HARPOON CONVEYOR

[75] Inventors: Roger T. Becker, Kalamazoo; Stephen L. Hatter, Portage; Donald McMullin, Jr., Kalamazoo, Mich.

[73] Assignee: Kalamazoo Conveyor Company, Kalamazoo, Mich.

[22] Filed: Apr. 13, 1972

[21] Appl. No.: 243,632

[52] U.S. Cl. ............................................... 198/221
[51] Int. Cl. ............................................ B65g 25/08
[58] Field of Search ............ 198/226, 60, 221, 224, 198/227; 100/150, 179

[56] References Cited
UNITED STATES PATENTS

| 592,133 | 10/1892 | Davis | 193/7 |
|---|---|---|---|
| 1,887,975 | 11/1932 | Betcher | 198/226 |
| 1,904,716 | 4/1933 | Biggs | 198/226 X |
| 2,540,670 | 2/1951 | Hoenecke | 198/226 X |
| 2,785,792 | 3/1957 | Cordis | 198/224 |

FOREIGN PATENTS OR APPLICATIONS

| 189,732 | 11/1922 | Great Britain | 198/226 |

Primary Examiner—Evon C. Blunk
Assistant Examiner—Douglas D. Watts
Attorney, Agent, or Firm—Samuel Kurlandsky

[57] ABSTRACT

A harpoon or chip conveyor is provided having a trough fitted with material retaining members or barbs on its inner sides and a plurality of interconnected plows driven in backward and forward or reciprocal motion by a reciprocating hydraulic power unit. Some of the retaining members or barbs are provided in the form of wedge-shaped or L-shaped angles affixed to the trough wall at their free ends by suitable means such as welding. The material retaining members are so oriented that a small vertical portion faces the direction of travel of the material being conveyed. As a further improvement, a cover is provided over the hydraulic power unit and piston rod in the form of a pair of telescoping bulkhead members, thereby protecting the hydraulic power unit from being fouled by chips and permitting trough loading at areas very close to the hydraulic unit without fouling the hydraulic unit. As a further improvement, for certain applications flexible barbs formed of a sheet plastic material may be utilized as a safety measure.

6 Claims, 6 Drawing Figures

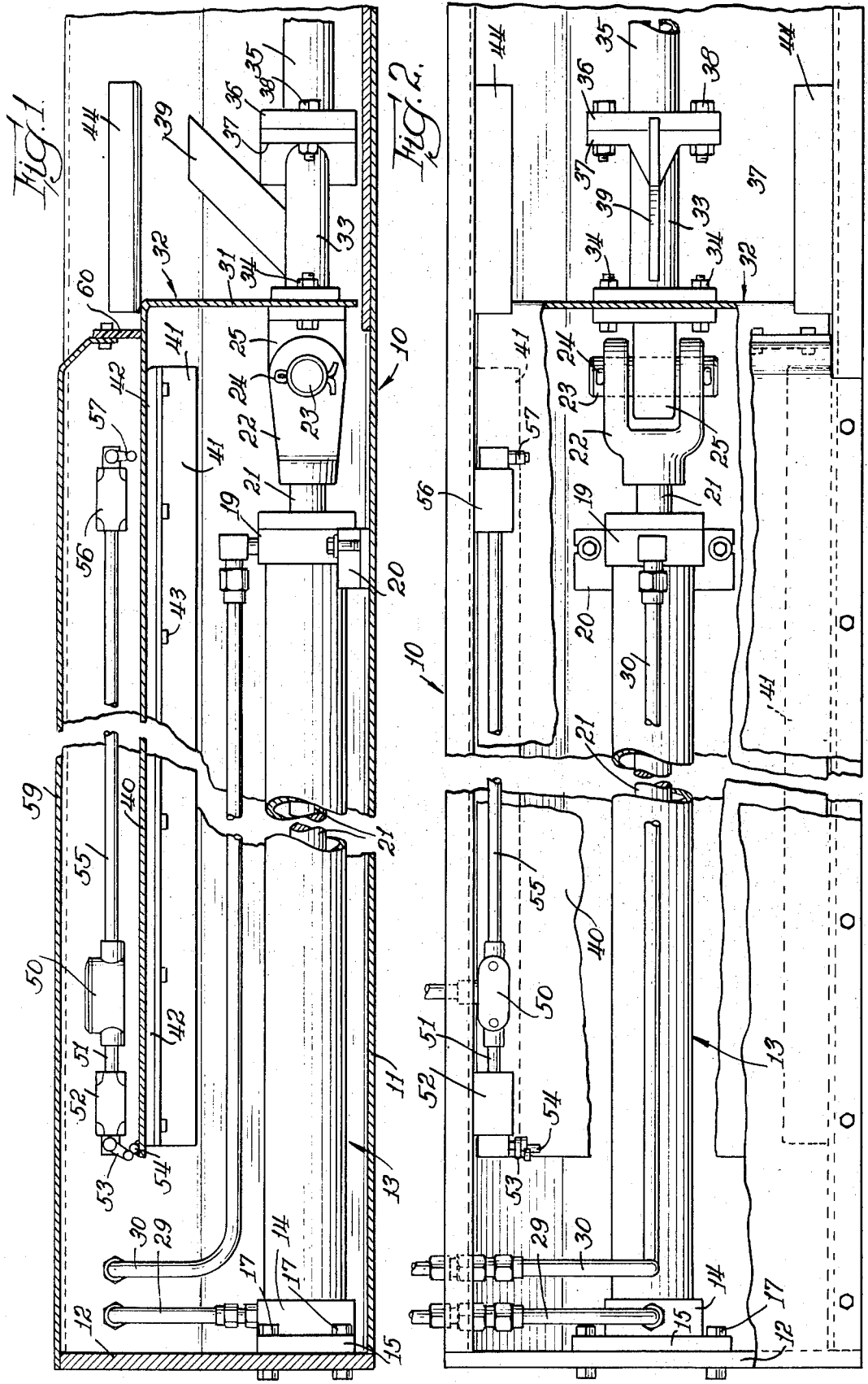

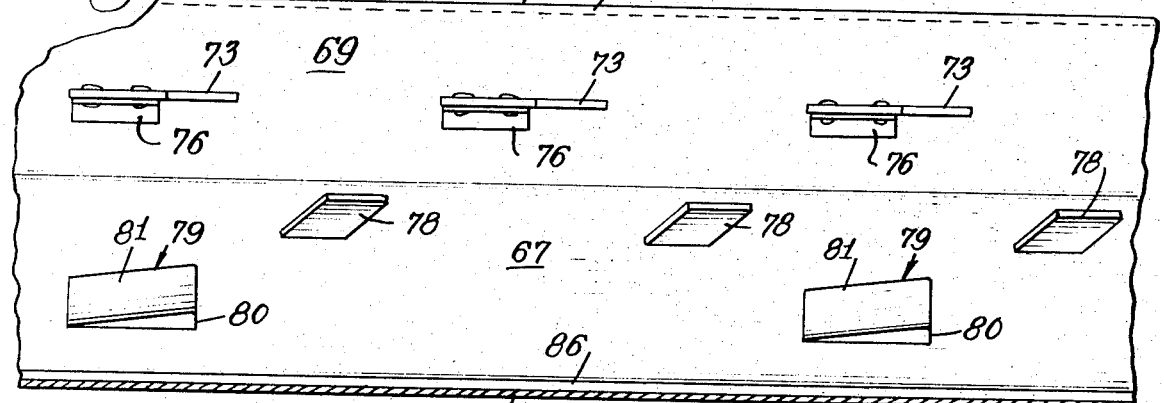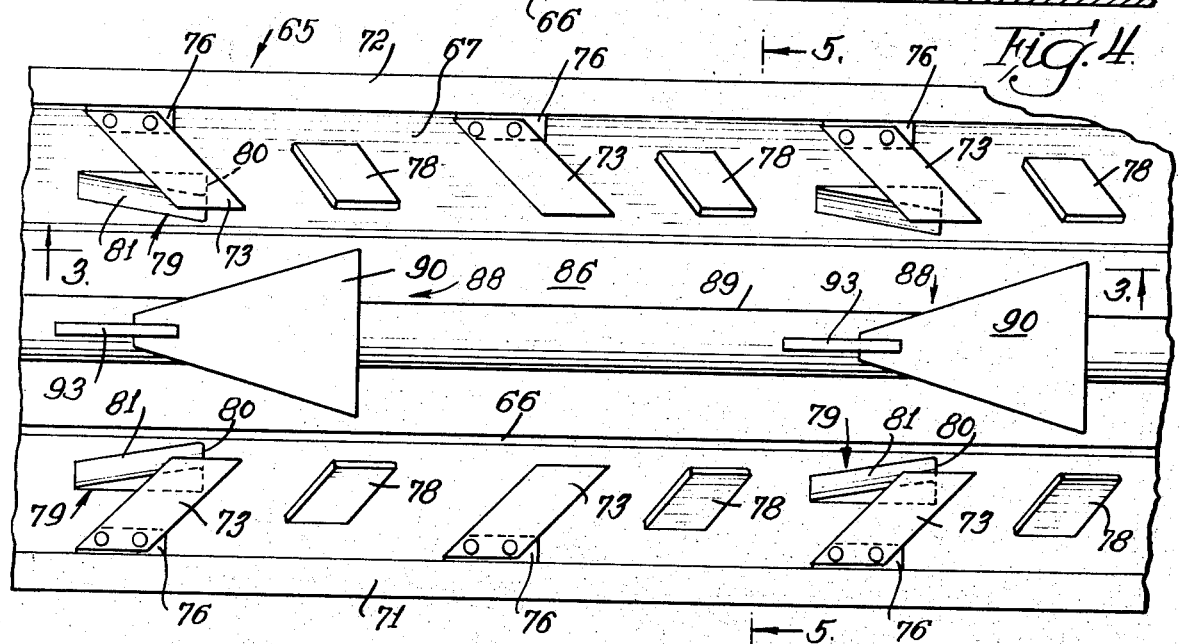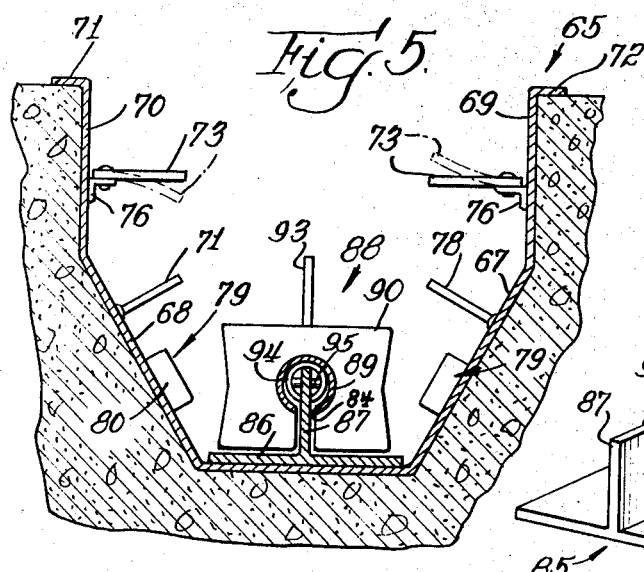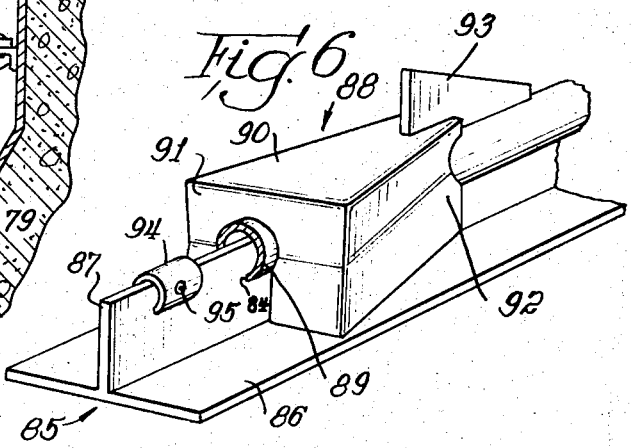

HARPOON CONVEYOR

BACKGROUND OF THE INVENTION

Harpoon-type or chip conveyors are finding widespread use in industry for many applications. Such conveyors comprise a long continuous trough mounted in a floor recess or on a platform having directional material retaining members or barbs mounted on the side wall thereof, a plurality of linearly arranged interconnected plows mounted for reciprocating motion within the trough, and a power means, generally of the hydraulic type, connected to one end of the assembly for reciprocating the entire train of plows backward and forward. The plows are so shaped that they engage and move the material being conveyed with each forward stroke, and slide apart the material to be conveyed with each rearward stroke. The retaining members or barbs cooperate on the rearward stroke to retain to conveyed material in place as the plows slide past. The entire trough and plow mechanism may be mounted within or below the floor of the establishment, as for example a machine shop, and may be fed by means of ducts from each machine. The conveyor is efficient, reliable, and relatively inexpensive to manufacture and operate. It permits establishments such as machine shops to be operated under complete conditions of cleanliness. Although the harpoon conveyor has been eminently successful in many fields, it still has some deficiencies. For example, when conveying certain types of material, the barbs or retaining members are somewhat deficient and permit the material to follow the rearward motion of the plows. A further deficiency is that the trough cannot be loaded at a point close to the hydraulic power unit, since there is a tendency for the chips to spill over into the vicinity of the power unit and to foul the piston and associated mechanism. A further deficiency is that there is some danger to the operator in attempting to clean the trough or dislodge fouled barbs.

SUMMARY OF THE INVENTION

It is an object of the invention to provide a harpoon conveyor having barbs which are more efficient than those provided in the prior art, particularly for applications in which a small trough is used.

It is still further an object to provide a harpoon conveyor having an improved arrangement to prevent the hydraulic power unit from being fouled by material which is deposited close to the power unit.

It is still a further object to provide a harpoon conveyor having retaining members or barbs which are safer to utilize and to clean than those of conventional equipment and are more efficient in retaining the conveyed material during the rearward stroke of the plows.

It is still another object to provide a harpoon conveyor having the stated improvements, and which is still relatively simple and inexpensive to produce.

Still further objects and advantages of the invention will appear as the description proceeds.

To the accomplishment of the foregoing and related ends, the invention, then, consists of the harpoon conveyor herein fully described and particularly pointed out in the claims, the annexed drawings, and the following description setting forth in detail certain illustrative embodiments of the invention, such disclosed embodiments illustrating, however, but several of the various ways in which the principles of the invention may be used.

BRIEF DESCRIPTION OF THE DRAWINGS

In the annexed drawings:

FIG. 1 is a side elevational view partly in cross-section showing an improved feature of the invention.

FIG. 2 is a top plan view partly in cross-section of the apparatus shown in FIG. 1.

FIG. 3 is a sectional view taken at the line 3—3 of FIG. 4, looking in the direction of the arrows, representing an extension of the apparatus shown in FIG. 1.

FIG. 4 is a top plan view representing an extension of the apparatus shown in FIG. 2.

FIG. 5 is a cross-sectional view taken at the line 5—5 of FIG. 4, looking in the direction of the arrows; and FIG. 6 is a perspective view of a plow and its supporting structure comprising a portion of the present apparatus.

DESCRIPTION OF THE PREFERRED EMBODIMENTS

Referring particularly to FIGS. 1 and 2, a portion of the apparatus of the present invention is shown comprising a hydraulic power unit 10, mounted on a drive section through 11 having an end plate 12 affixed thereto. A hydraulic cylinder assembly 13 is shown having a rear cylinder end plate 14 with mounting flanges 15 affixed to the end plate 12 by means of nut and bolt assemblies 17. A front cylinder end plate 19 is mounted on the cylinder by means of a bracket 20. A piston (not shown) is slidably mounted within the cylinder assembly 13 and affixed to a piston rod 21. The remote end of the piston rod 21 slidably extends through an opening in the cylinder plate 19, and has its remote end affixed to a clevis 22. The clevis 22 is pivotally mounted by means of a clevis pin 23 and cotter pins 24 to an eye-bracket 25. The eye-bracket 25 is mounted on the forward wall 31 of a traveling bulkhead 32 having a horizontal wall 40. A drive bracket 33 is affixed to the eye-bracket 25 by means of nut and bolt assemblies 34, with the traveling bulkhead wall 31 sandwiched therebetween and supported by the assembly. The drive bracket 33 is in turn affixed to a plow drive shaft 15, a bracket 36 of the plow drive bracket being affixed to a flange 37 of the drive bracket 33 by means of nut and bolt assemblies 38. A vertical retaining member or barb 39 is affixed to the drive bracket 33. The traveling bulkhead 32 is supported at its horizontal upper wall 40 by a bracket 41 having a bearing strip 42 affixed thereto by nut and bolt combinations 43. Traveling bulkhead guides 44 mounted on the side walls of the trough guide the reciprocal movement of the traveling bulkhead. An electrical control system is mounted above the traveling bulkhead comprising an electrical junction box 50 an electrical duct 51 connecting to a limit switch 52. The limit switch 52 is provided with a switch lever arm 53 which is operated by means of a cam 54 mounted at the end of the traveling bulkhead 32. The junction box 50 is also connected by means of an electrical duct 55 to a limit switch 56 having a switch lever arm 57. The switch lever arm 57 is engaged by the cam 54 when the traveling bulkhead reaches its forwardmost position. A cover or fixed bulkhead 59 is mounted over the electrical assembly and has affixed to its forward end a wiper 60 of a flexible material such as rubber or plastic which engages the upper wall 40 of the traveling bulkhead 32 and prevents chips or other conveyed material from lodging between the fixed and movable bulkheads.

Referring to FIGS. 3–5, a forward portion of the conveyor system is shown, comprising a conveyor trough 65 having a bottom 66, oblique wall members 67 and 68, and vertical wall members 69 and 70 terminating in flanges 71 and 72, respectively. Upper barbs or retaining members 73 which may be of either a plastic material or metal are mounted on brackets 76. Metallic intermediate barbs 78 are affixed to the oblique wall members.

Mounted at the lower portions of the oblique wall members 67 and 68 are wedge-shaped retaining members or ramps 79 having a steep or substantially vertical face or minor leg 81 at the forward portion of the retaining members, and a trailing surface or major leg 81 having an inclined surface of small slope. The retaining members, wedges or ramps 79 are so arranged that when the conveyed material is caused to move forward by forward motion of the plows, they do not offer any substantial resistance to impede forward motion, and the material therefore rides over the retaining members. However, when the plows apply a rearward force against the conveyed material during the rearward stroke, the almost vertical surfaces 80 of the retaining members trap and impede the conveyed material and prevent any substantial rearward movement. The retaining members 79 may be in the form of solid wedges affixed to the trough by suitable means such as welding. Alternatively, the retaining members 79 may be formed from strap metal in L-form, having minor and major legs providing the surfaces 80 and 81. The ends of the legs may then be welded to the trough with the outer surface of the small leg providing the forward vertical surface 80 and the outer surface of the long leg forming the inclined surface 81. The retaining members, whether in L-form or in solid wedge form, are extremely efficient in preventing substantial rearward motion of the conveyed material and offering substantially no resistance to forward motion of the conveyed material.

Referring to FIG. 6, a rail 85 is shown having a horizontal plate 86 and a vertical flange 87. The rail may be affixed to the bottom 66 of the trough 65. A plow assembly 88 is mounted on the rail and comprises a split tubular drive shaft or member 89 having a longitudinal slot 84 slidably mounted on the rail 85 with the vertical flange 87 extending through the slot 84 of the drive shaft 89. A plot 90 is affixed to the drive shaft 89 by any suitable method such as welding. The plow 90 comprises a flat forward driving end 91 and a rearwardly converging rear end 92 designed to slip past the material being conveyed on the rearward stroke of the plow. A vertical barb 93 is affixed to the plow and drive shaft and assists in accomplishing forward movement of the conveyed material. The drive shaft 89 rides on a plurality of split bearings 94 mounted on the vertical flange 87 and affixed thereto by setscrews 95.

In operation hydraulic power is applied to the hydraulic cylinder assembly 13 causing it to move backward and forward, thus imparting reciprocal motion to the entire train of plow assemblies 88. Material to be conveyed such as chips from machine tools may be introduced into the trough at any position, including portions close to the hydraulic power unit. On the forward motion of the wide flat potion 91 of the plows 88 move the conveyed material forward. On the return stroke, because of the converging shape 92 of the rear portion of the plow 88, the plow slides past the chips or other conveyed material. The retaining members or barbs 79, 71 and 73 assist in retaining the conveyed material and preventing any appreciable movement of the material rearwardly. As a result, with each forward stroke the conveyed material is moved forward and with each return stroke it remains substantially stationary. Eventually the material is conveyed to the end of the tray and discharged. The particular form of the retaining members 79 renders them exceptionally efficient in preventing rearward motion of the conveyed material and permitting the material to slide forward on the forward stroke.

During operation, the hydraulic cylinder assembly 13 and the electrical system of switches are completely covered and protected from being fouled by chips or other conveyed material by the presence of the fixed cover or bulkhead 59 cooperating with the traveling bulkhead 32 which telescopes into the fixed bulkhead 59. The space between the fixed and traveling bulkheads is closed off by means of the wiper 60 so that a completely sealed chamber is formed by the two bulkheads. Consequently, material to be conveyed may be introduced into the trough close to the hydraulic system without fouling it during operation.

The chips or other conveyed material may be introduced along the trough at any point. A plurality of plows are positioned along the entire length of the trough. Consequently, material introduced into the trough immediately begins forward travel and so continues with each forward movement of each plow. Eventually the material is transported to the distal end of the trough and discharged into a suitable container.

The harpoon conveyor of the present invention has many advantages over similar equipment disclosed in the prior art. First, the existance of the combination of the fixed and traveling bulkheads permit material to be conveyed to be introduced close to the power unit without danger of fouling the unit. Further, the present wedge-shaped retainers are extremely efficient both in retaining chips or other materials during the rearward stroke of the plows, and permitting forward movement of the conveyed material during the forward stroke without offering substantial resistance. A further advantage of the invention resides in the use of retaining members or barbs 73 formed of a sheet of a flexible plastic material for use with conveyed materials having relatively low mass. The retaining members are effective in preventing rear movement of the conveyed material. In spite of this, they provide added safety in that if the operator should accidentally introduce his head into the trough while the apparatus is in operation, the retaining members bend when they encounter the hand and thus prevent serious injury which may result when steel retaining members are utilized having sharp points. The apparatus of the present invention is relatively simple and inexpensive to build and to operate.

While but only a few forms of the invention have been shown and described, other forms will now be apparent to those skilled in the art. Therefore, the embodiments shown in the drawings are merely for illustrative purposes, and are not intended to limit the spirit and scope of the invention as above described and illustrated in the drawings.

The embodiments of the invention in which an exclusive property or privilege is claimed are defined as follows:

1. A harpoon-type conveyor for forwardly conveying material deposited therein, comprising:
   a. an elongated trough, the top portion of which is substantially completely open for receiving material along its entire length,
   b. guide means mounted in said trough and extending along the length of said trough,
   c. a plurality of interconnected plows linearly arranged and slidably mounted on said guide means,
   d. power means mounted in said trough and driving linkage connecting said power means to said plows and arranged to move said plows backward and forward, said power means comprising a stationary hydraulic cylinder, a piston mounted therein for reciprocal movement, and a piston rod affixed thereto at one end and operatively connected at the other end to said driving linkage,
   e. a bulkhead assembly comprising:
      1. a fixed bulkhead positioned to cover said hydraulic cylinder, said fixed bulkhead being positioned a spaced distance from a plane defined by the top of said cylinder,
      2. a traveling bulkhead arranged to telescope with respect to said fixed bulkhead and mounted for moving with said driving linkage, said traveling bulkhead being in L-shaped sheet-form and having a major leg horizontally disposed below said fixed bulkhead and a spaced distance from said plane defined by the top of said cylinder and a minor leg vertically disposed and affixed to said driving linkage for moving forward and backward as said plows move, and
      3. cam means on said traveling bulkhead arranged for movement with said traveling bulkhead along a predetermined path, and
   f. a pair of limit switches below said stationary bulkhead, said limit switches being arranged in spaced relationship adjacent opposite ends of said path for alternate actuation by said cam means during forward and backward movement of said traveling bulkhead,
   g. said fixed bulkhead and said traveling bulkhead cooperating to form a cover for keeping said power means and said limit switches covered and protected from said material throughout the forward and backward movement of said driving linkage and said plows.

2. A conveyor according to claim 1, wherein resilient wiping means is affixed at the forward edge of said fixed bulkhead engaging said traveling bulkhead for preventing conveyed material from entering between said fixed and said traveling bulkheads.

3. A conveyor according to claim 1, wherein traveling guides are mounted on the side walls of said trough, engaging and supporting said traveling bulkhead.

4. A conveyor according to claim 5, wherein guides are mounted on the side walls of said trough, engaging said traveling bulkhead vertically.

5. A harpoon-type conveyor according to claim 1, further comprising:
   a plurality of retaining members mounted on the side walls of said trough having means defining a substantially vertical forwardly oriented surface and a second surface adjacent thereto sloping rearwardly at an acute angle with respect to the surface of said trough, wherein said retaining members are each in the form of a triangular prism mounted at one edge having a forwardly oriented edge substantially perpendicular to the trough wall on which it is mounted, and an adjacent edge sloping rearwardly at an acute angle with respect to the trough wall, said retaining members having a greater width than the height of the forward end and being so designed that when said plows move rearwardly, the forward walls of said retaining members restrict rearward movement of the conveyed material, and whereby when said plows move forwardly, the rearwardly sloped edges of said retaining members do not materially restrict the forward movement of the conveyed material.

6. A harpoon-type conveyor according to claim 1, further comprising:
   a plurality of sheet-form retaining members formed of a flexible plastic material each mounted at one edge on the side walls of said trough, said retaining members being adapted to restrain rearward movement of the conveyed material during the rearward stroke of said plows and to permit forward movement of said material during the forward movement of said plows, and wherein said retaining members are adapted to bend laterally when encountering an object in order not to damage the object.

* * * * *

UNITED STATES PATENT OFFICE
CERTIFICATE OF CORRECTION

Patent No. 3,828,920　　　　　　　　Dated August 13, 1974

Inventor(s) Roger T. Becker et al.

It is certified that error appears in the above-identified patent and that said Letters Patent are hereby corrected as shown below:

Col. 2, line 27, delete "through" and insert -- trough --.

Col. 4, line 1, delete "potion" and insert -- portion --.

Col. 4, line 55, delete "head" and insert -- hand --.

Signed and sealed this 28th day of January 1975.

(SEAL)
Attest:

McCOY M. GIBSON JR.　　　　　　　C. MARSHALL DANN
Attesting Officer　　　　　　　　Commissioner of Patents